Feb. 16, 1926.
C. F. JENKINS
1,573,609
MACHINE FOR MAKING OPTICAL PRISMS
Filed Nov. 4, 1922
7 Sheets-Sheet 4
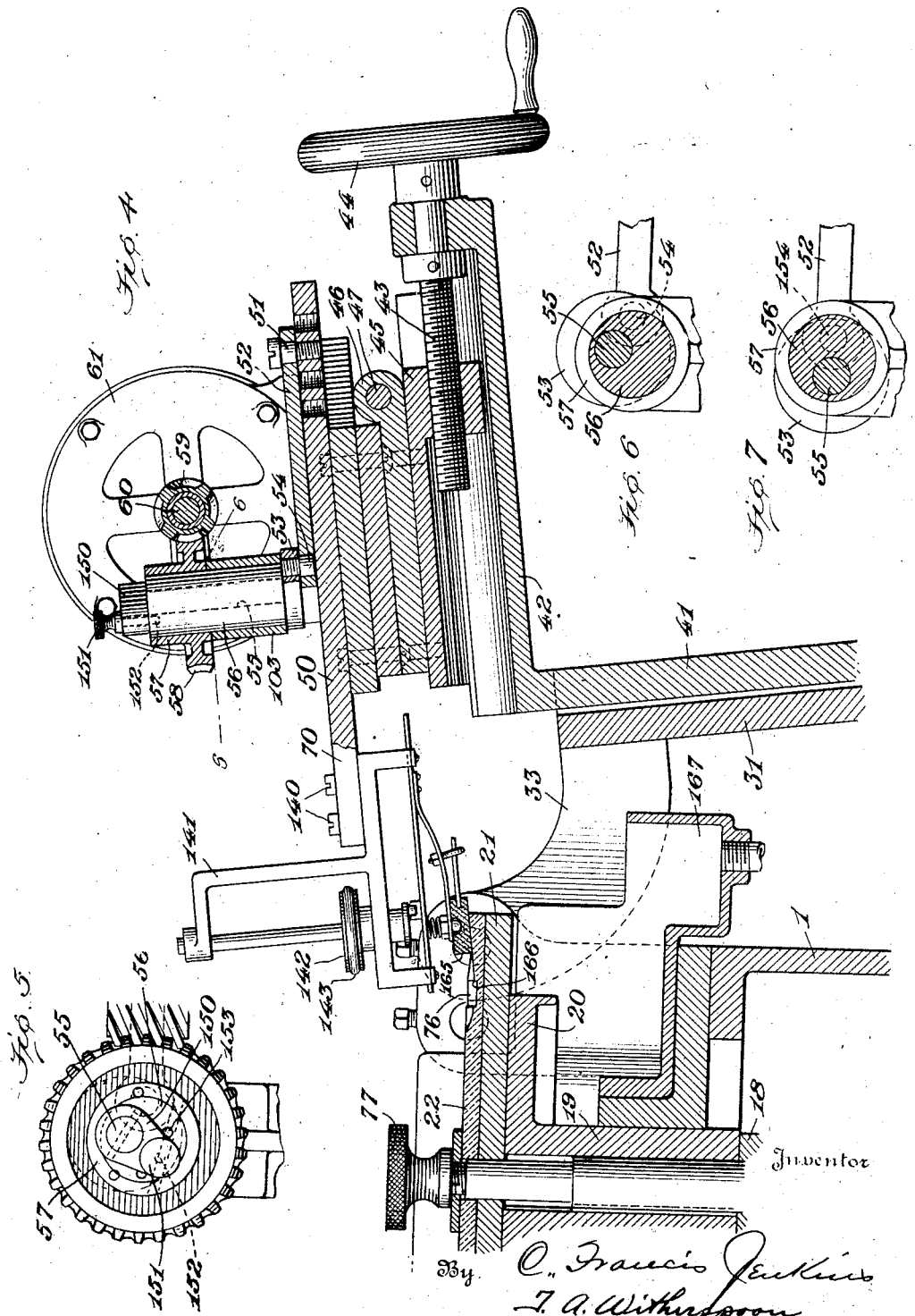

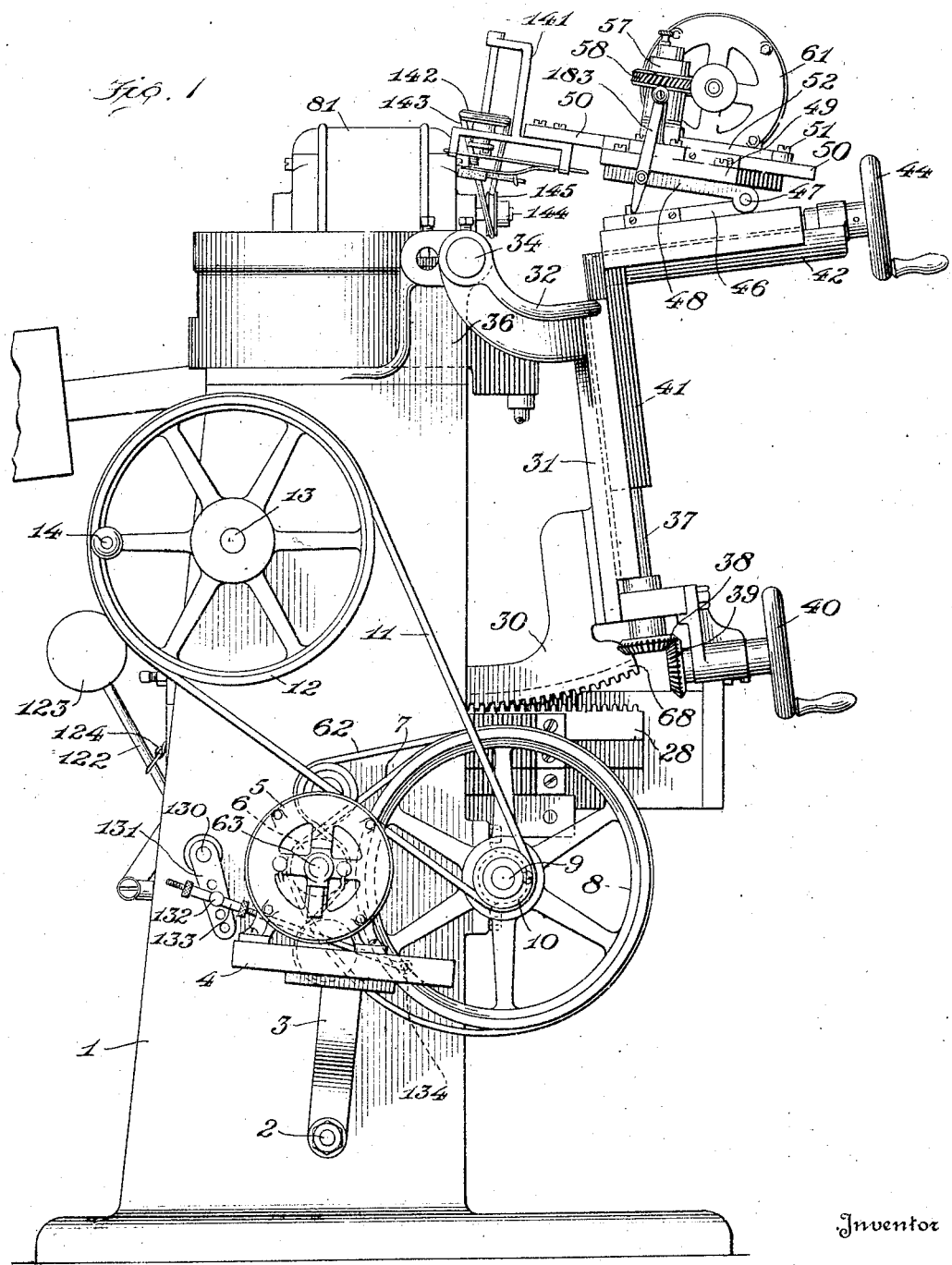

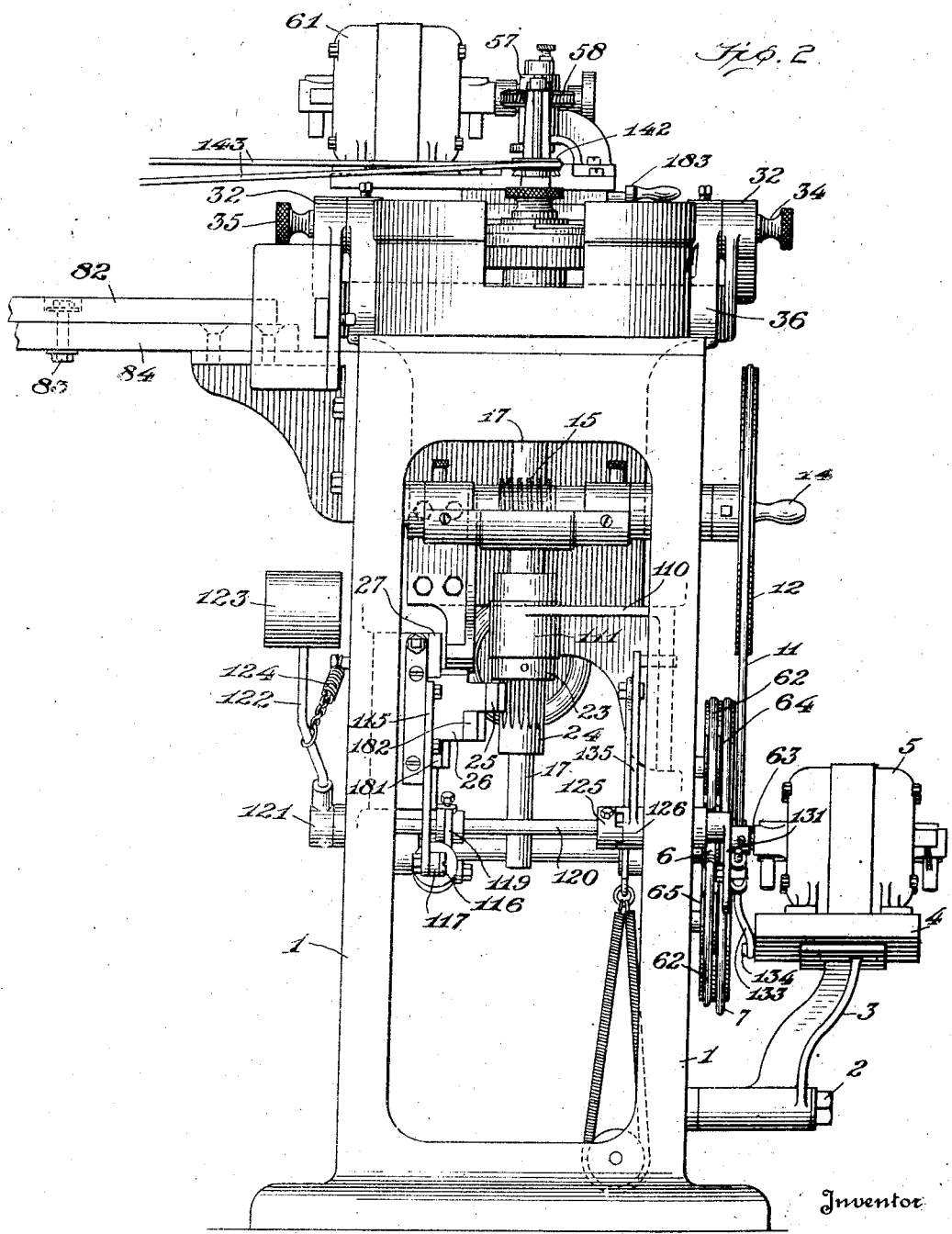

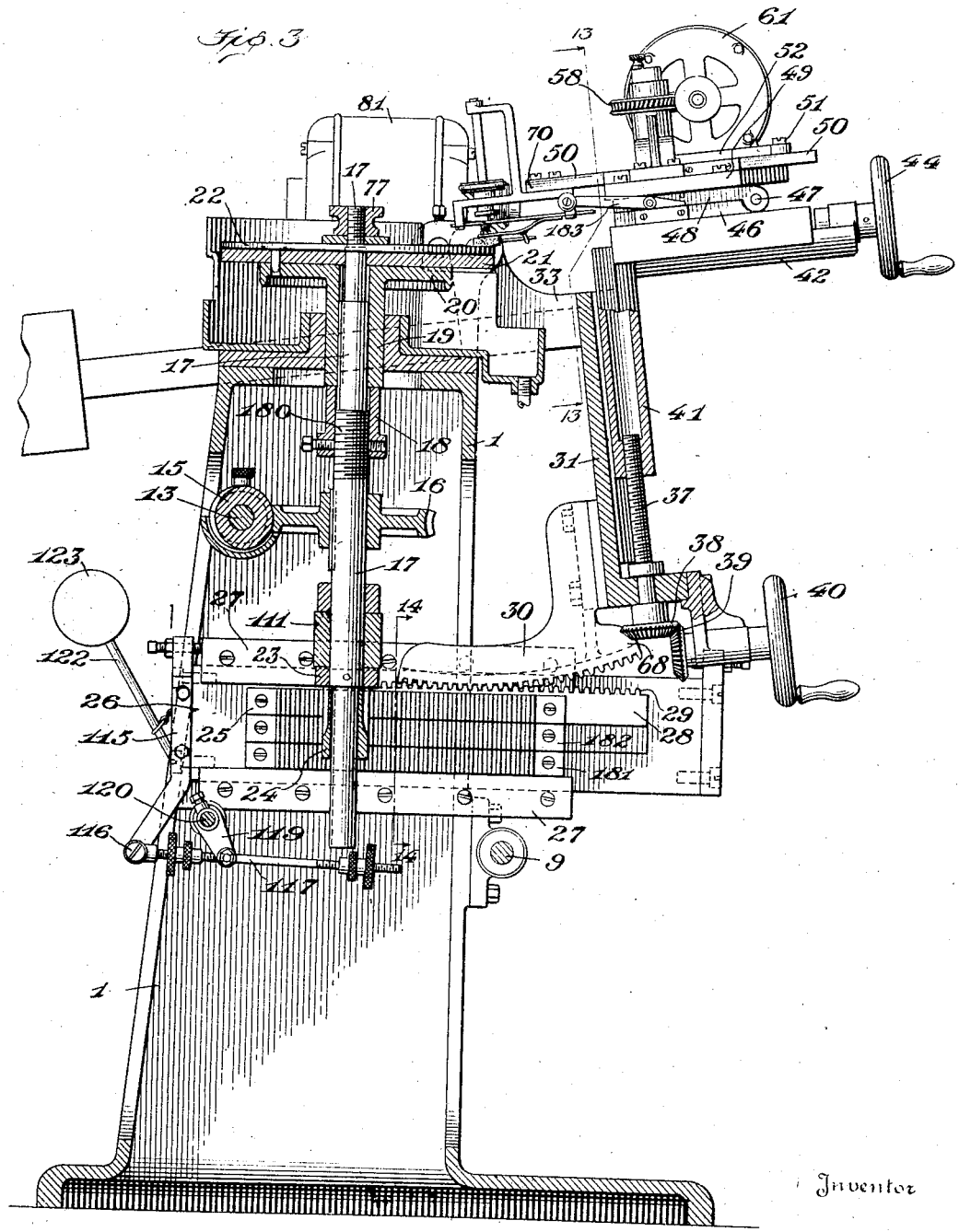

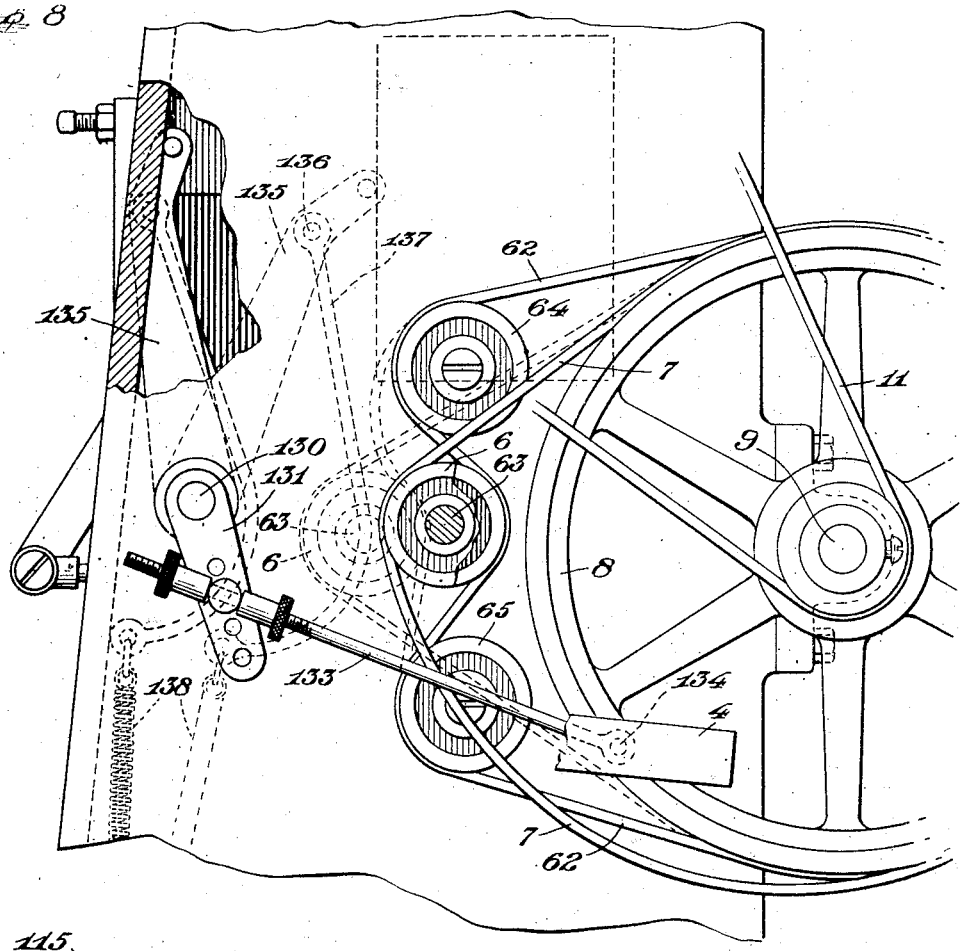

Feb. 16, 1926.
C. F. JENKINS
1,573,609
MACHINE FOR MAKING OPTICAL PRISMS
Filed Nov. 4, 1922  7 Sheets-Sheet 6
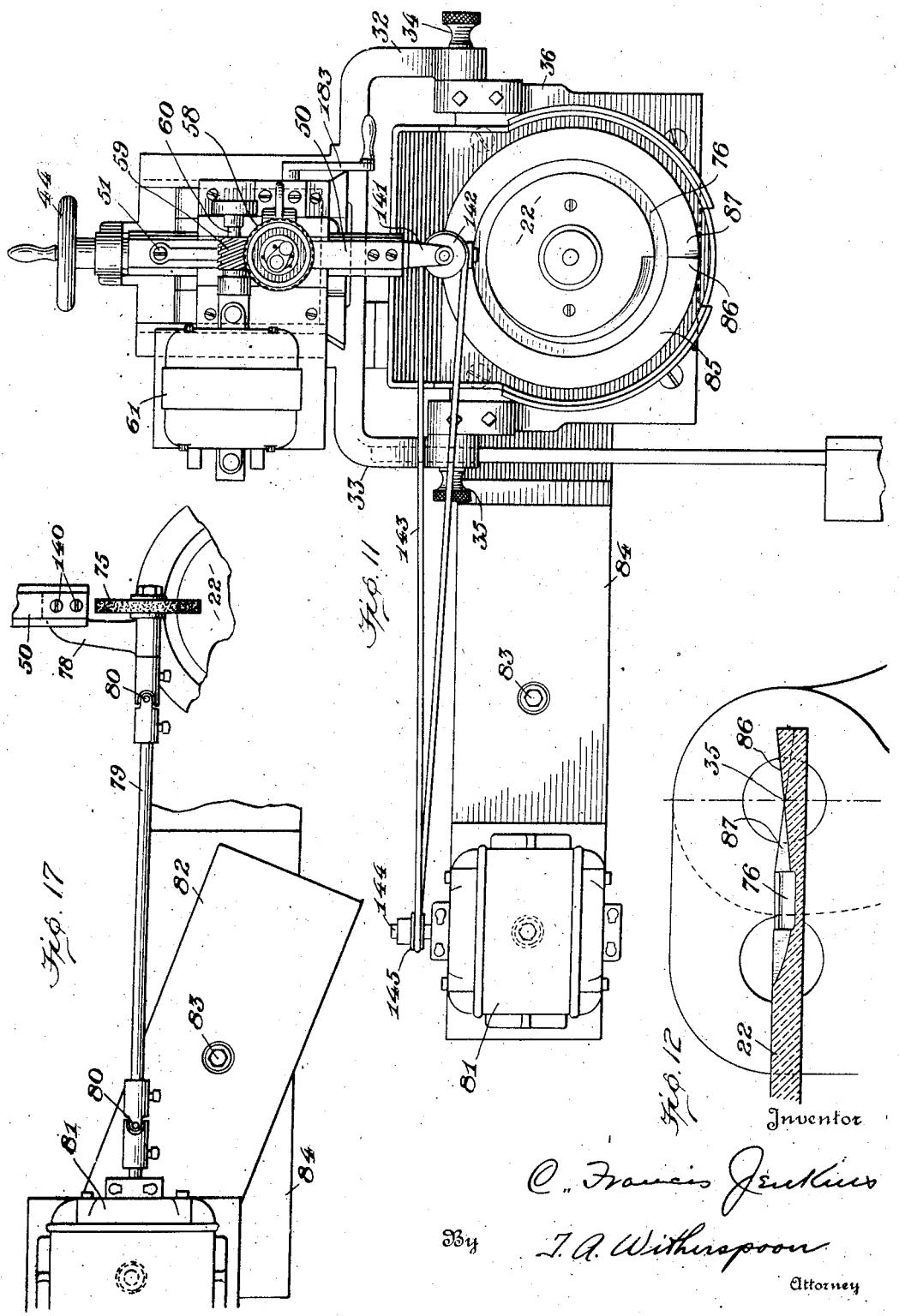

Feb. 16, 1926.
C. F. JENKINS
1,573,609
MACHINE FOR MAKING OPTICAL PRISMS
Filed Nov. 4, 1922          7 Sheets-Sheet 7
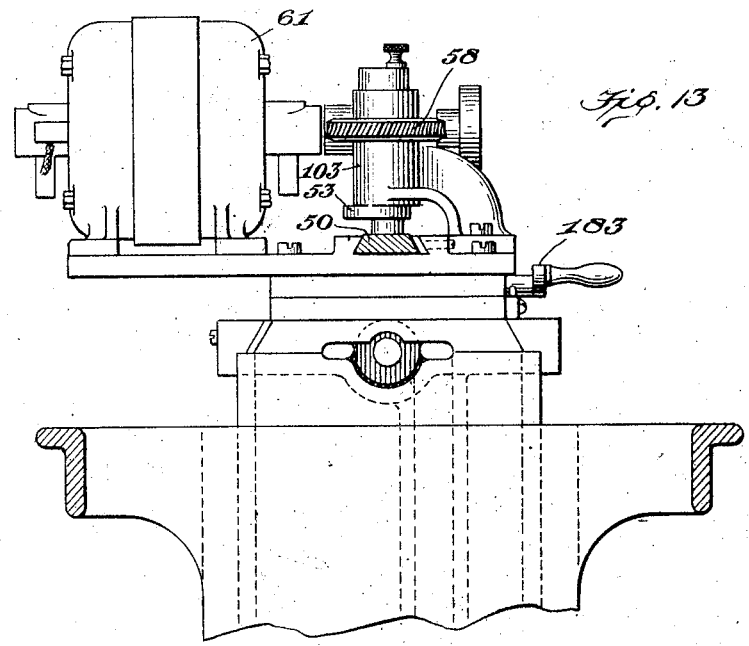
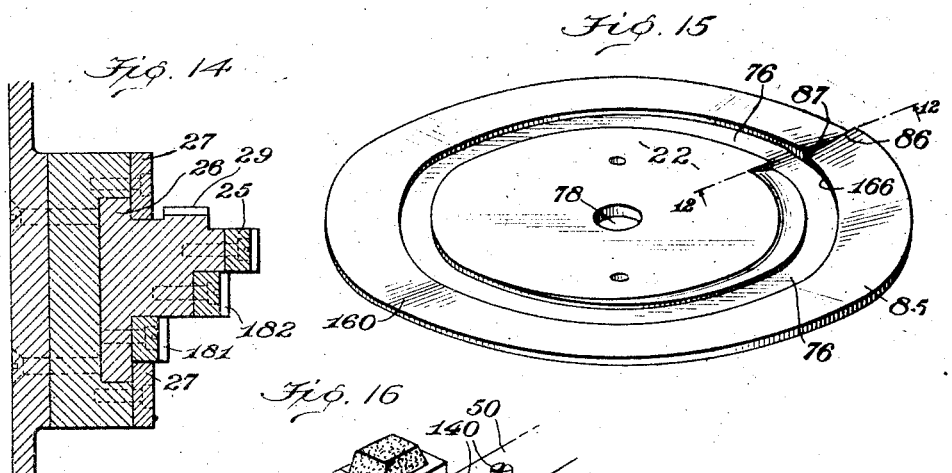
Inventor
C. Francis Jenkins
By T. A. Witherspoon
Attorney Patented Feb. 16, 1926.

1,573,609

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

MACHINE FOR MAKING OPTICAL PRISMS.

Application filed November 4, 1922. Serial No. 599,171.

*To all whom it may concern:*

Be it known that I, CHARLES FRANCIS JENKINS, a citizen of the United States, residing at Washington, in the District of Columbia, have invented certain new and useful Improvements in Machines for Making Optical Prisms; and I do hereby declare the following to be a full, clear, and exact description of the invention, such as will enable others skilled in the art to which it appertains to make and use the same.

This invention relates to a machine for making prisms or lenses suitable for transmitting pictures by wireless waves, and for other purposes, and has for its object to provide a mechanism of this character which will be simple in construction, certain in operation, and more efficient in use than those heretofore proposed.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a side elevational view of a machine made in accordance with this invention;

Figure 2 is a front elevational view of the parts shown in Figure 1;

Figure 3 is a side elevational view in section of the machine shown in Figure 1;

Figure 4 is a sectional detail view of a portion of the parts shown in Figure 3;

Figure 5 is a sectional view of a portion of the parts shown in Figure 4;

Figure 6 is a section taken on the line 6—6 of Figure 4, showing the parts in one position;

Figure 7 is a view similar to Figure 6, showing the parts in another position;

Figure 8 is an enlarged detail side elevational view partly broken away of a portion of the reversing mechanism shown in Figure 1;

Figure 9 is a detail elevational view partially broken away of a portion of the reversing mechanism shown in Figure 2;

Figure 10 is a sectional view taken on the line 10—10 of Figure 9, looking in the direction of the arrows;

Figure 11 is a plan view of the parts shown in Figure 1;

Figure 12 is a sectional view on the line 12—12 of Figure 15, looking in the direction of the arrows;

Figure 13 is a sectional view on the line 13—13 of Figure 3, looking in the direction of the arrows;

Figure 14 is a section taken on the line 14—14 of Figure 3, looking in the direction of the arrows, with certain parts omitted;

Figure 15 is a perspective view of a circular double prism made by this machine;

Figure 16 is a detail perspective view of one of the polishing means or sticks employed by this machine; and Figure 17 is a top plan view of the abrading tool to drive mechanism associated therewith.

1 indicates any suitable framework on which is mounted the pivot 2 carrying the swinging arm 3 provided with the motor support 4 to which is attached the motor 5 carrying a pulley 6 around one side of which passes the belt 7 which drives the larger pulley 8 mounted on the shaft 9, carrying the pulley 10 around which passes the belt 11 driving the pulley 12 mounted on the shaft 13 and preferably provided with the hand operating means 14. As best shown in Figures 1, 2 and 3, the shaft 13 is provided with the worm 15 meshing with the worm gear 16 rigid with the vertically disposed rotating shaft 17 which is supported by the tubular members 18 and 111, mounted on brackets 110 rigid with the frame of the machine. One of these brackets is shown in Figure 2. On top of the sleeve 18 rests the sleeve 19 rigid with the table 20 and the shaft 17, and on the table 20 rests the prism support 21 adapted to receive the disk like prism 22 being manufactured. The said shaft 17 is provided with the collar 23 and with the pinion 24 meshing with one of a plurality of racks 25 mounted on a slide member 26 and held in the slideways 27 as best shown in Figures 2, 3 and 14. Rigid with the sliding member 26 is the rack member 28 having the vertically disposed teeth 29 with which mesh the teeth of the curved rack 30 rigid with the bracket or frame 31 provided with a pair of supporting arms 32 and 33 pivoted respectively at 34 and 35 to the upper portions 36 of the machine, as best shown in Figures 1, 2, 3 and 11. Mounted in the frame 31 is the screw member 37 provided with the pinion 38 with which meshes the pinion 39 adapted to be operated by the hand wheel 40, as will be clear from Figure 3. Operated by the screw member 37 is the vertically reciprocating member 41 having the right angular extension 42 as best shown in Figure 4. Mounted in said member 42 is the screw member 43 adapted to be operated by the hand wheel 44 and connected with said screw member 43 is the slide member 45 to which is rigidly attached the member 46 carrying the hinged pivot 47, on which swings the supporting member 48, supporting the member 49, see Figures 1 and 3, on which slides the polishing arm 50.

Adjustably secured to said polishing arm 50, as by the means 51 is the operating member 52 secured to the cam 53 as by the means 54. Said cam 53 is mounted on the short shaft 55 eccentrically mounted in the short cylindrical member 56 rotating with the sleeve 57 carrying the worm wheel 58 engaging the worm 59 rigid with the shaft 60 of the motor 61.

Referring more particularly to Figures 2 and 8, it will be observed that the rim of the pulley 8 in addition to accommodating the belt 7 has passed around the same an additional belt 62. It will further be observed that above the pulley 6 carried by the motor shaft 63 there is an idler pulley 64 over which said belt 62 passes, that said belt 62 passes around a side of said pulley 6 opposite to that occupied by the said belt 7, and that below said pulley 6 there is an additional idler pulley 65 around which said belt 62 passes. It will further be observed that as the motor 5 swings on its supporting members 3 and 4 around the pivot 2 as a center by means, presently to be disclosed, its shaft 63 moves from the full line position shown in Figure 8 to its dotted line position shown in said figure, and that in so moving it carries the pulley 6 with it.

The effect of thus moving from the full line position to the dotted line position shown in Figure 8 is to tighten the belt 7 and to cause the pulley 8 and the belt 11 to turn in a given direction, depending upon the direction in which the motor shaft 63 is driven. Further, said movement from said full line position to said dotted line position shown in Figure 8 has the effect of loosening the belt 62 and thus to cease driving said pulley 8 and belt 11 from said belt 62. On the other hand, when the motor shaft 63 and driving pulley 6 is in its full line position as shown in Figure 8, the belt 62 is tightened while the belt 7 is loosened, and the pulley 8 and belt 11 is turned in an opposite direction, or is reversed. In other words, the motion of the belt 11 will be reversed each time the motor shaft 63 shifts from its full line to its dotted line position shown in Figure 8. The reversal of the motion of the belt 11, of course, reverses the rotation of the pulley 12 and shaft 13. The reversal of the shaft 13 in the manner disclosed of course reverses the motion of the worm 15 and worm gear 16, as well as the shaft 17 and pinion 24. The reversal of the rotation of the pinion 24 causes the reversal of the sliding motion of the racks 25, slide member 26 and rack 28. In other words, when the motor 5 is swung on its pivot 2 by means to be presently described, the horizontally disposed rack 28 is reciprocated to and fro and the toe 68 of the curved rack 30 is raised and lowered and thus swings the frame 31 and arms 32 and 33 on their pivots 34 and 35 respectively. The oscillation of the said motor 5 and motor shaft 63 around the pivot 2 as a center is accomplished as follows:—Rigid with the slide member 26, see Figures 2, 3, 9 and 10, is the vertically depending arm 115 to which is pivoted as at 116 the adjustable rod 117.

To said rod 117 is pivotally secured as at 118 the crank arm 119 rigid with the shaft 120, the left hand end of which, as seen in Figure 2, passes through the frame of the machine and has attached thereto as at 121 a weighted arm 122 provided with the swinging weight 123 controlled by the spring 124. The other, or right hand end of the shaft 120, as seen in Figure 2, is provided with the clutch member 125 which coacts with the corresponding clutch member 126, as best shown in Figures 2 and 9. Between the clutch members 125 and 126 is provided a considerable amount of lost motion as evidenced by the open spaces 127. The said clutch member 126 is rigid with the short shaft 130 which is a continuation of the shaft 120 and which extends through the right hand side of the frame as seen in Figure 2, and has rigidly attached thereto the crank arm 131 best shown in Figures 1 and 8.

Adjustably secured to one end of the said crank 131, as at 132 is the adjustable rod 133 whose other end 134 is pivotally secured to the motor support 4 as best illustrated in Figures 1 and 2. Also rigid with the clutch member 126 is the swinging arm 135 extending up inside the frame work as illustrated in Figures 2 and 8. To this said arm 135 is adjustably secured as at 136, the swinging member 137 controlled by the spring 138 as shown. It thus results that as the motor 5 reciprocates, the rack 25 and 28, in the manner above disclosed, likewise reciprocate the vertically disposed arm or bracket 115 and the adjustable rod 117 thus oscillating the crank 119 and shaft 120. That is to say, as the slide member 26 nears the completion of its stroke toward the left, for example, as seen in Figure 3, the crank 119 will be turned toward the left until it reaches its vertical position and then slightly beyond its vertical position whereupon the arm 122 and weight 123 will suddenly fall toward the right as seen in Figure 3, and thus will suddenly turn the clutch member 125, in a clockwise direction as seen in Figure 3. Owing to the lost motion afforded by the spaces 127, said clutch member 125 will rather violently strike the clutch member 126 and thus will force suddenly the arm 135 from the full line position in Figure 8 over to its dotted line position shown in said figure, and will likewise force suddenly the crank 131 toward the left as seen in Figure 8. The sudden movement of the crank 131 in the direction just mentioned will pull the adjustable rod 133 as well as the motor support 4 suddenly toward the left as seen in Figure 8. The movement of the motor support 4 toward the left in the manner disclosed will, of course, carry the motor 5 and its operating shaft 63 together with the pulley 6 suddenly from the full line position shown in Figure 8 to the dotted line position shown in said figure, with the result that the belt 7 tightens and the belt 62 loosens, which has the effect of reversing the pulley 8 and belt 11 in the manner above disclosed. Of course, the reversal of the motion of the revolving belt 11 will move the racks 25 and 28 in a reverse direction or toward the right, as seen in Figure 3, and this reciprocation of the said racks will continue indefinitely as long as the motor 5 is operated. The raising, however, of the toe 68 and frame 31 in the manner above disclosed, only slightly raises the extreme left hand end 70 of the slidable polishing arm 50, and its associated polishing parts, due to the fact that said end and polishing parts are quite near the line joining said pivots 34 and 35. In the same way, the falling of said end 70 and its associated polishing parts is likewise slight when the toe 68 of the curved rack 30 falls. It is necessary, however, that the extreme end of the polishing parts have a slight motion up and down periodically around the pivots 34 and 35 as a center, in order to properly shape the circular prisms that are manufactured by this machine, all as will appear more fully hereinafter.

Said prisms are preferably made from disks of glass 22 and circular grooves 76 are preferably cut into their faces as best illustrated in Figure 15. After said groove 76 is cut in a disk 22 the latter is firmly secured to the table 21 by the screw member 77 and the upper end of the shaft 17 which passes through the central orifice 78 of the disk as will be clear from Figures 4 and 15. The disk 22 being thus firmly clamped in place an abrading wheel 75 is radially disposed of said disk 22 as best shown in Figure 17. Said wheel 75 is conveniently supported from the bracket 78 and is rotated by the shaft 79 having the universal joints 80 and which shaft is turned by the motor 81 supported on the member 82 pivoted as at 83 to the frame member 84 of the machine. The abrading disk 75 being thus rapidly rotated by the motor 81, the glass disk 22 is then rotated on its center by the means above disclosed, whereupon the circumferential groove indicated at 85 in Figure 11 is cut entirely around the said disk 22. But, as said wheel 75 is slightly raised and lowered periodically during the rotation of the disk 22 by means of the arm 78 which is attached to the polishing arm 50, see Figure 17, the groove 85 is deeper at its end 86 than at its end 87, all as will be clear from Figures 11 and 15. That is to say, the inner edge of the groove 85 will be deeper at the point 86 than it will at the point 87, while the outer edge of said groove 85 or of the disk itself will be thicker at the point 86 than at the point 87 due to the slight up and down movement of the polishing arm 50, above described.

The disk 22 being thus provided roughly with the circumferential groove 85, and having the original groove 76 extending below the inner edge of the groove 85, said disk is now ready for the polishing action. The polishing or finishing of the prisms bounded on one side by the groove 85 and on the other side by the surface of the disk 22, is accomplished by a plurality of polishing tools employing different polishing mediums in the manner well known. That is to say, these various polishing tools are readily taken off and attached to the reciprocating polishing arm 50 as will be clear from Figures 3, 4 and 16.

In Figure 4, for example, the screws 140 enable one to readily attach and detach the polishing mechanism 141 which is provided with the pulley 142 around which passes the driving belt 143 which is driven from the motor 81 in Figure 11, it being understood that said motor may be the same as that shown in Figure 17 with the driving shaft 144 turned through an angle of 90° and with the driving pulley 145 attached thereto or it may be an entirely different motor according to the desires of the operator.

Of course, as soon as the abrading wheel 75, has finished its operation, the arm 78 and the shaft 79 are removed and the polishing mechanism 141 is attached to the reciprocating polishing arm 50, as will be clear from the drawings.

When the polishing mechanism 141 has performed a sufficient degree of work, it in turn is removed and another mechanism substituted. In Figure 16, the carbon stick 147 held by the means 148 is shown as attached to the polishing arm 50. In substituting these various polishing devices the one for the other, it may be desirable that the stroke of the arm 50 be changed and such change may be desired at other times. Accordingly, the adjustable means 51 attaches the reciprocating arm 52 to said polishing arm and in addition to this, the eccentrically mounted shaft 55 has attached thereto the crank arm 150, see Figures 4, 5, and 7, which is provided with the knob 151 and the pin 152 adapted to be rotated around the short cylindrical shaft 56 and to be secured in any one of the holes 153. The turning of the crank arm 150 in the manner just disclosed moves the shaft 55 around the center of the sleeve 57 and thus bodily moves in a lengthwise direction the operating member 52 and polishing member 50, all as will be readily understood from the drawings. In other words, the effective stroke of the said arm 50 may be thus readily adjusted by turning the knob 151 and securing the pin 152 into its proper hole 153.

The operation of this machine will be clear from the foregoing but may be briefly summarized as follows:—

A transparent disk 22 provided with the groove 76 is clamped to the table 21, and the motor 5 is started. Said motor through the shaft 63 and belt 62 will revolve the pulley 8 and through the belt 11 will revolve the pulley 12 and shaft 13, thus moving through the pinion 24 the racks 25, 28 and 30, until said racks complete their stroke in one direction. When the rack 25 and slide 26 thus reach the end of their stroke, the reversing shaft 120 by means of the connections 115, 117 and 119 turns the arm 122 and weight 123 beyond their dead center, thus permitting them to fall and to cause the clutch member 125 to strike the clutch member 126 a blow.

The sudden striking of the clutch member 126 in the manner disclosed suddenly turns the short shaft 120 and cranks 131 and 135 in a clockwise direction as seen in Figure 8, and thus through the connection 133 suddenly pulls the motor support 4 and motor shaft 63 from their full line positions shown in Figure 8 to their dotted line positions shown in said figure, with the result that the belt 62 is loosened, the belt 7 is tightened, and the pulleys 8 and 12 together with the shafts 13 and 17 reversed in their motions. The reversal of the motion of the shaft 17 and pinion 24 reverses the motion of the racks 25, 28 and 30, and this reversed motion continues until the weight 123 again passes its dead center while moving in the new direction, and the clutch member 125 strikes the clutch member 126 a new blow in the new direction of rotation, when the motor support 4 and motor shaft 63 will be again moved to their full line position shown in Figure 8. When this occurs the belt 7 will be suddenly loosened and the belt 62 suddenly tightened thus again reversing the movement of the racks back to the former or original direction.

It will thus be seen that the reciprocation of the rack 28 is automatic and will continue as long as the motor 5 is operated. It will also be clear that as the toe 68 of rack 30 lifts it raises the frame 31 and the end portion 70 of the reciprocating polishing arm around the common axis of the pivots 34 and 35 as a center, for the reason that the curve of said rack 30 is struck from said axis as a center. Of course, as the toe 68 falls, said portion 70 reverses its motion around said axis. The parts are so timed when finishing a plate having only two reversed prisms like that shown in Figure 15 that a complete revolution of the plate corresponds to a complete oscillation of the rack 28, and of the said portion 70 around said axis. It thus results that in cutting the rough groove 85 with the abrading wheel 75, see Figure 17, the said wheel will be in its highest position when working at the portion 85 and will be gradually lowered until the portion 160 is reached, which is 180° from said portion 86 and said wheel will then begin to rise and will continue to rise until the portion 87 is reached which substantially coincides circumferentially with the portion 86. These up and down motions of the abrading and other tools controlled by the arm 50 produce annular shaped prisms around the circumference of the disk 22 which are reversed in their optical actions, which are tapered in thickness between the points 86 and 160, and 87 and 160, and whose thickened ends 86 and 87 are joined to each other as shown.

It will be clear that the extreme edge 165 of the polishing device shown in Figure 4 like all the others used in this machine, reciprocates radially of the plate 22 to and from the central axis 17, as said plate rotates or oscillates, and that as the groove 76 extends below the inner edge 166 of the annular prism said edge 165 has ample opportunity to work over the face of the prism and to pass beyond said inner prism edge 166 and thus polish to the fullest extent the entire prism surface.

The polishing material passes on into the groove 76 of the plate and also into the receptacle 167 with which the machine is provided.

It is preferred to so adjust the hand wheel 40 and screw 37, as well as the screw 180 on the shaft 17, as will cause the polished face of the prism and the working faces of the polishing tools to occupy positions very slightly above the axis of the pivots 34 and 35 when the thicker ends 86 and 87 of the prisms are being worked on, and to occupy positions slightly below said axis when the thinner ends 160 of said prisms are being worked on. That is, said working faces will operate in the plane of said axis when half way between the thick and thin ends of the prisms. In Figures 3 and 14 a plurality of racks 181 and 182 are illustrated as disposed different distances from the central axis 17. These racks are adapted to coact with pinions similar to 24 but of a larger diameter and which when substituted for said pinion 24 may cause the movements of the working tools around the axis of said pivots 34 and 35 to be accelerated. This acceleration in turn will shorten the angular length of the prisms, and increase the number that can be formed around a single disk.

The pivoted lever 183 enables the operator to swing the working tools and their associated parts on the hinge 47, as best shown in Figure 1, and to hold said parts in their elevated position, thus facilitating the cleaning and removal of the disks 22.

It is obvious that those skilled in the art may vary the details of construction as well as the arrangement of parts without departing from the spirit of the invention and therefore I do not wish to be limited to the above disclosure except as may be required by the claims.

What is claimed is:

1. In a machine of the character described, the combination of a support; means for moving said support around a center; means for securing a circular transparent member to said support; means for reciprocating a finishing member radially of said circular member; and means to move said last named means around a second fixed center while said transparent member is being moved around said first named center.

2. In a machine of the character described the combination of a support; means to oscillate said support; a second means for securing a transparent member to said support; a third reciprocating means for acting on a circular portion of said transparent member while the latter is oscillating; means for pivoting said last named means on an axis; and means for moving said third means around said axis as a center to shift the same into and out of operative engagement with said transparent member.

3. In a machine of the character described, the combination of a support; a second means to oscillate said support; a means for securing a transparent member to said support; a third means comprising a reciprocating member for acting on a circular portion of said transparent member while the latter is oscillating; means for pivoting said last named means on an axis; and means for moving said third means around said axis as a center.

4. In a machine of the class described the combination of means for oscillating a transparent member around an axis; a reciprocating means adapted to act on said member in a plane inclined to said axis; and means for changing the inclination of said plane while said transparent member is oscillating around said axis.

5. In a machine of the class described the combination of means for moving a transparent member around an axis; a reciprocating means adapted to act on said member in a direction inclined to said axis; and means for automatically slowly and constantly changing the inclination of said direction throughout successive reciprocations while said transparent member is moving around said axis.

6. In a machine of the class described, the combination of oscillating means for moving a transparent member around an axis; a reciprocating means adapted to act on said member in a direction radial to said axis and in a plane inclined to said axis; and means comprising an automatic reciprocating member for increasing and decreasing the inclination of said plane while said transparent member is moving around said axis.

7. In a machine of the class described the combination of means for moving a transparent member around an axis; a reciprocating means adapted to act on said member in a direction inclined to said axis; and oscillating means for automatically slowly and constantly changing the inclination of said direction throughout successive reciprocations while said transparent member is moving around said axis.

8. In a machine of the class described the combination of means for moving a transparent member around an axis; a reciprocating means adapted to act on said member in a direction inclined to said axis; and means for automatically slowly and constantly changing the inclination of said direction between and throughout successive reciprocations while said transparent member is moving around said axis.

9. In a machine for making optical prisms the combination of means for oscillating a transparent disk around a fixed axis; a reciprocating means adapted to act upon the rim portion of said disk during the oscillation thereof; and a pivoting and supporting means for causing said reciprocating means to act upon said disk in a plane inclined to said axis.

10. In a machine for making optical prisms, the combination of means for oscillating a transparent disk around a fixed axis; a reciprocating means adapted to act upon the rim portion of said disk during the oscillation thereof; a pivoting and supporting means for causing said reciprocating means to act upon said disk in a plane inclined to said axis; and automatic means for periodically changing the inclination of said plane.

11. In a machine for making optical prisms the combination of means for oscillating a transparent disk around a fixed axis; a reciprocating means adapted to act upon the rim portion of said disk in a radial direction during the oscillation thereof; a pivoting and supporting means for causing said reciprocating means to act upon said disk in a plane inclined to said axis; and means for adjusting the stroke of said reciprocating means.

12. In a machine for making optical prisms the combination of means for oscillating a transparent disk around a fixed axis; a reciprocating means for acting upon the rim portion of said disk during its oscillation; pivoting and supporting means for causing said reciprocating means to move in a plane inclined to said axis; and means for manually moving said reciprocating means in a direction longitudinal of said axis.

13. In a machine of the character described, the combination of a support; means for moving said support around a center; automatic means comprising a reciprocating rack for reversing the direction of motion of said support; means for securing a circular transparent member to said support; means for reciprocating a finishing member radially of said circular member; and means to move said last named means around a second fixed center while said transparent member is being moved around said first named center.

14. In a machine of the character described, the combination of a support; means comprising a reciprocating rack and connections to oscillate said support; a second means for securing a transparent member to said support; a third means for acting on a circular portion of said transparent member while the latter is oscillating; means for pivoting said last named means on an axis; and means for moving said third means around said axis as a center.

15. In a machine of the class described, the combination of means comprising an oscillating pinion and a reciprocating rack for moving a transparent member around an axis; a reciprocating means adapted to act on said member in a plane inclined to said axis; and means for changing the inclination of said plane while said transparent member is moving around said axis.

16. In a machine of the class described the combination of means comprising an oscillating pinion and a reciprocating rack with which said pinion meshes for moving a transparent plate around a fixed axis; means adapted to act on and to reciprocate in contact with said plate toward and away from said axis during the movement of said plate; pivoting means for said second named means; and means to move said second named means around said pivoting means while said plate is moving.

17. In a machine for making optical prisms the combination of means comprising a reciprocating rack and an oscillating pinion for oscillating a transparent disk around a fixed axis; a reciprocating means adapted to act upon the rim portion of said disk during the oscillation thereof; and a pivoting and supporting means for causing said reciprocating means to act upon said disk in a plane inclined to said axis.

18. In a machine for making optical prisms the combination of means comprising a rack and pinion for oscillating a transparent disk around a fixed axis; a reciprocating means for acting upon the rim portion of said disk during its oscillation; pivoting and supporting means for causing said reciprocating means to move in a plane inclined to said axis; and means for manually moving said reciprocating means in a direction longitudinal of said axis.

19. In a machine of the character described, the combination of a support; means for moving said support around a center; means for securing a circular transparent member to said support; a finishing member, means comprising a cam for reciprocating said finishing member radially of said circular member; and means comprising a curved rack and a straight rack with which said curved rack engages to move said last named means around a second fixed center while said transparent member is being moved around said first named center.

20. In a machine of the character described the combination of a support; means to oscillate said support; a second means for securing a transparent member to said support; a third means for acting on a circular portion of said transparent member while the latter is oscillating; means for pivoting said last named means on an axis; and means comprising curved and straight racks for moving said third means around said axis as a center.

21. In a machine of the class described the combination of means for moving a transparent member around an axis; a reciprocating means adapted to act on said member in a plane inclined to said axis; and means comprising a curved rack and a straight rack meshing therewith for changing the inclination of said plane while said transparent member is moving around said axis.

22. In a machine of the class described, the combination of means for moving a transparent plate around a fixed axis; means adapted to act on and reciprocate in contact with said plate toward and away from said axis during the movement of said plate; pivoting means for said second named means; and means comprising curved and straight racks to move said second named means around said pivoting means while said plate is moving.

23. In a machine for making optical prisms the combination of means for oscillating a transparent disk around a fixed axis; a reciprocating means adapted to act upon the rim portion of said disk during the oscillation thereof; and a pivoting and supporting means comprising a curved rack for causing said reciprocating means to act upon said disk in a plane inclined to said axis.

24. In a machine for making optical prisms the combination of means for oscillating a transparent disk around a fixed axis; a reciprocating means for acting upon the rim portion of said disk during its oscillation; pivoting and supporting means comprising intermeshing curved and straight racks for causing said reciprocating means to move in a plane inclined to said axis; and means for manually moving said reciprocating means in a direction longitudinal of said axis.

25. In a machine of the class described the combination of means for moving a transparent member around an axis; a reciprocating means adapted to act on said member in a radial direction inclined to said axis; and means for automatically slowly and constantly changing the inclination of said direction throughout successive reciprocations while said transparent member is moving around said axis.

26. In a machine of the class described the combination of means for moving a transparent member around an axis; a reciprocating means adapted to act on said member in a radial direction inclined to said axis; and means for automatically slowly and constantly changing and reversing the inclination of said direction throughout successive reciprocations while said transparent member is moving around said axis.

27. In a machine for making optical prisms, the combination of a shaft; means for securing a prism to said shaft; a second shaft geared to said first named shaft; a motor; driving connections between said motor and said second shaft; means comprising a pivoted weight for suddenly changing said driving connections to cause said shafts to oscillate said prism; and means moving radially of said prism to work upon its surface.

28. In a machine for making optical prisms, the combination of a shaft; means for securing a prism to said shaft; a second shaft geared to said first named shaft; a motor; driving connections between said motor and said second shaft; means comprising a pivoted weight for suddenly changing said driving connections to cause said shafts to oscillate said prism; means moving radially of said prisms to work upon their surfaces; and means for swinging said radially moving means around an axis while operating upon said surfaces.

29. In a machine for making optical prisms, the combination of a shaft; means for securing a prism to said shaft; a second shaft geared to said first named shaft; a motor; driving connections between said motor and said second shaft; means comprising a pivoted weight for suddenly changing said driving connections to cause said shafts to oscillate said prism; means moving radially of said prism to work upon its surface; and means comprising curved and straight oscillating racks for swinging said radially moving means around an axis while operating on said surface.

30. In a machine of the class described the combination of means for moving a transparent member around an axis; a reciprocating means adapted to act on said member in a direction inclined to said axis; and oscillating means for automatically slowly and constantly changing and reversing the inclination of said direction throughout successive reciprocations while said transparent member is moving around said axis.

31. In a machine of the class described the combination of means for moving a transparent member around an axis; a reciprocating means adapted to act on said member in a direction inclined to said axis; and means for automatically slowly and constantly changing the inclination of said direction throughout successive reciprocations, about an axis intersecting the middle point of the range of reciprocation, while said transparent member is moving around said first mentioned axis.

32. In a machine for making optical lenses, the combination of means for oscillating a transparent member around a fixed axis; reciprocating means adapted to act upon the rim portion of said member during the oscillation thereof; and a second axis passing through the center of the said rim portion of the member for pivotally supporting said reciprocating means.

33. In a machine for making optical lenses, the combination of means for oscillating a transparent member around a fixed axis; adjustable reciprocating means adapted to act upon the rim portion of said member in a radial direction during the oscillation thereof; and a second axis passing through the center of the said rim portion of the member for pivotally supporting said reciprocating means.

34. In a machine for making optical lenses, the combination of means for oscillating a transparent member around a fixed axis; reciprocating means adapted to act upon the rim portion of said member during the oscillation thereof; and a second axis passing through the center of the said rim portion of the member tangentially of the finished surface thereof, for pivotally supporting said reciprocating means.

35. In a machine for making optical lenses, the combination of means for oscillating a transparent member around a fixed axis; reciprocating means adapted to act upon the rim portion of said member during the oscillation thereof; a second fixed axis passing through the center of the said rim portion of the member for pivotally supporting said reciprocating means; and means to move said reciprocating means about said second axis.

36. In a machine for making optical lenses, the combination of means for oscillating a transparent member around a fixed axis; reciprocating means adapted to act upon the rim portion of said member during the oscillation thereof; a second fixed axis passing through the center of the said rim portion of the member for pivotally supporting said reciprocating means; and oscillating means to move said reciprocating means about said second axis during the oscillation of said member.

In testimony whereof I affix my signature.

CHARLES FRANCIS JENKINS.